US008724250B2

(12) United States Patent
Poorman et al.

(10) Patent No.: US 8,724,250 B2
(45) Date of Patent: May 13, 2014

(54) READING MAGNETIC TAPE

(75) Inventors: Paul W. Poorman, Meridian, ID (US);
Mike Alan Holmberg, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 199 days.

(21) Appl. No.: 13/438,461

(22) Filed: Apr. 3, 2012

(65) Prior Publication Data

US 2013/0258519 A1    Oct. 3, 2013

(51) Int. Cl.
*G11B 21/02* (2006.01)
*G11B 5/127* (2006.01)

(52) U.S. Cl.
USPC ............................ 360/75; 360/110; 360/134

(58) Field of Classification Search
USPC .......... 360/55, 75, 110, 77.12, 316, 121, 132, 360/134, 241, 291, 60, 241.1
See application file for complete search history.

(56) References Cited

U.S. PATENT DOCUMENTS

| | | | |
|---|---|---|---|
| 4,616,279 A | 10/1986 | Poorman | |
| 6,018,444 A | 1/2000 | Beck et al. | |
| 6,229,669 B1 | 5/2001 | Beck et al. | |
| 6,236,537 B1 | 5/2001 | Poorman et al. | |
| 6,373,656 B2 * | 4/2002 | Poorman et al. | 360/122 |
| 6,388,836 B2 * | 5/2002 | Anderson et al. | 360/128 |
| 6,639,753 B1 | 10/2003 | Henze et al. | |
| 6,647,613 B2 | 11/2003 | Beck et al. | |
| 6,945,489 B2 * | 9/2005 | Anderson et al. | 242/348 |
| 6,999,274 B2 | 2/2006 | Beck et al. | |
| 7,111,383 B2 | 9/2006 | Henze et al. | |
| 7,116,522 B2 * | 10/2006 | Poorman | 360/241 |
| 7,193,812 B2 | 3/2007 | Eaton | |
| 7,196,866 B2 | 3/2007 | Poorman et al. | |
| 7,206,167 B2 | 4/2007 | Beck et al. | |
| 7,301,724 B2 * | 11/2007 | Brittenham | 360/77.12 |
| 7,382,569 B2 * | 6/2008 | Biskeborn et al. | 360/77.12 |
| 7,505,221 B2 * | 3/2009 | Watson | 360/53 |
| 7,548,395 B2 * | 6/2009 | Biskeborn et al. | 360/77.12 |
| 7,656,614 B2 | 2/2010 | Hansen et al. | |
| 7,746,588 B2 | 6/2010 | Koeppe et al. | |
| 8,144,414 B2 * | 3/2012 | Cherubini et al. | 360/48 |
| 8,184,394 B2 * | 5/2012 | Poorman et al. | 360/77.12 |
| 8,233,246 B2 * | 7/2012 | Koeppe | 360/316 |
| 8,254,058 B2 * | 8/2012 | Biskeborn | 360/122 |
| 8,587,905 B2 * | 11/2013 | Koeppe | 360/316 |
| 2001/0007170 A1 | 7/2001 | Beck et al. | |
| 2001/0012178 A1 | 8/2001 | Anderson et al. | |
| 2001/0019464 A1 | 9/2001 | Poorman et al. | |
| 2002/0057524 A1 | 5/2002 | Beck et al. | |
| 2003/0030939 A1 | 2/2003 | Beck et al. | |
| 2004/0125501 A1 | 7/2004 | Henze et al. | |

(Continued)

OTHER PUBLICATIONS

Argumendo, A.J., et al., "Scaling tape-recording areal densities to 100 Gb/in squared", IBM Journal, Research & Development, Jul./Sep. 2008, 15 pp, vol. 52 No. 4/5, International Business Machines, San Jose, California.

*Primary Examiner* — Ali Neyzari

(57) ABSTRACT

A system and method for reading magnetic tape are provided herein. The system includes a tape head including two read arrays. Each of the two read arrays includes a first set of data read elements of a first channel pitch and a second set of data read elements of a second channel pitch, and the first set of data read elements and the second set of data read elements are interleaved. The tape head also includes a write array located between the two read arrays.

20 Claims, 8 Drawing Sheets

(56) References Cited

U.S. PATENT DOCUMENTS

| | | |
|---|---|---|
| 2004/0233581 A1 | 11/2004 | Poorman |
| 2005/0040273 A1 | 2/2005 | Anderson et al. |
| 2005/0068668 A1 | 3/2005 | Beck et al. |
| 2005/0134999 A1 | 6/2005 | Poorman et al. |
| 2008/0074785 A1 | 3/2008 | Hansen et al. |
| 2008/0259494 A1 | 10/2008 | Biskeborn |
| 2010/0232047 A1 | 9/2010 | Cherubini et al. |
| 2011/0199703 A1 | 8/2011 | Hansen et al. |
| 2011/0255195 A1 | 10/2011 | Poorman et al. |
| 2012/0019956 A1 | 1/2012 | Poorman et al. |

\* cited by examiner

100

500

600

READING MAGNETIC TAPE

BACKGROUND

Linear tape drives are widely used for computer backup and archiving. A linear tape drive includes a magnetic tape head that reads and writes magnetic tape linearly. Linearly means that data on the magnetic tape is read, and written, in sequence along the length of the magnetic tape. Multiple channels of data may be written to, and read from, the magnetic tape in parallel using multiple elements on the magnetic tape head. However, due to manufacturing limitations, adjacent track recording on the magnetic tape is not yet feasible. Therefore, the spacing between adjacent elements on the magnetic tape head, referred to as the channel pitch, is larger than the spacing between adjacent tracks on the magnetic tape, referred to as the track pitch. For example, some linear tape drives have magnetic tape heads with a channel pitch of approximately 100 µm, while magnetic tape often has a track pitch of approximately 10 µm. A sixteen channel magnetic tape head with a channel pitch of 100 µm yields a magnetic tape head span of 1.6 mm. As channel count increases to 32 or more, the magnetic tape head span can easily exceed 3 mm.

Due to its flexibility, magnetic tape is susceptible to expansion and shrinkage, or contraction, with fluctuations in temperature and humidity. This may compromise the ability of magnetic tape heads to read the magnetic tape. More specifically, the outermost magnetic tape head elements may no longer be properly positioned over their respective data tracks on the magnetic tape. This may compromise the ability of current magnetic tape heads to read the magnetic tape.

BRIEF DESCRIPTION OF THE DRAWINGS

Certain examples are described in the following detailed description and in reference to the drawings, in which.

DETAILED DESCRIPTION OF SPECIFIC EXAMPLES

Various techniques have been employed to improve the dimensional stability of magnetic tape. For example, the magnetic tape substrate may be tensilized using, for example, polyethylene terephthalate (PET), polyethylene naphthalate (PEN), or aramid substrates. As used herein, tensilizing refers to a process for increasing the resistance of the magnetic tape substrate to contraction or expansion. However, even though flexible magnetic tape substrates are carefully engineered to minimize the differential expansion relative to the magnetic tape head, not all of the dimensional instability can be eliminated. Further, in many cases, tensilizing the magnetic tape substrate may not reduce the contraction and expansion to an acceptable level.

In addition, the track width of the magnetic tape may be increased in order to allow magnetic tape heads to read the magnetic tape more easily. Similarly, the magnetic tape head width may be reduced relative to the track width of the magnetic tape. However, increasing the magnetic tape track width reduces the capacity per cartridge that would otherwise be available within the magnetic tape. Further, reducing the magnetic tape head width reduces the signal to noise ratio and complicates the achievement of error rate goals during the reading process.

According to the method and system described herein, a linear tape drive includes a magnetic tape head with interleaved data read elements that may be used to read dimensionally unstable magnetic tape. The interleaved data read elements may include two sets of data read elements with different channel pitches. Such interleaved data read elements may allow for the recovery of data from magnetic tape, regardless of whether the magnetic tape has experienced expansion or contraction.

Figure 1:
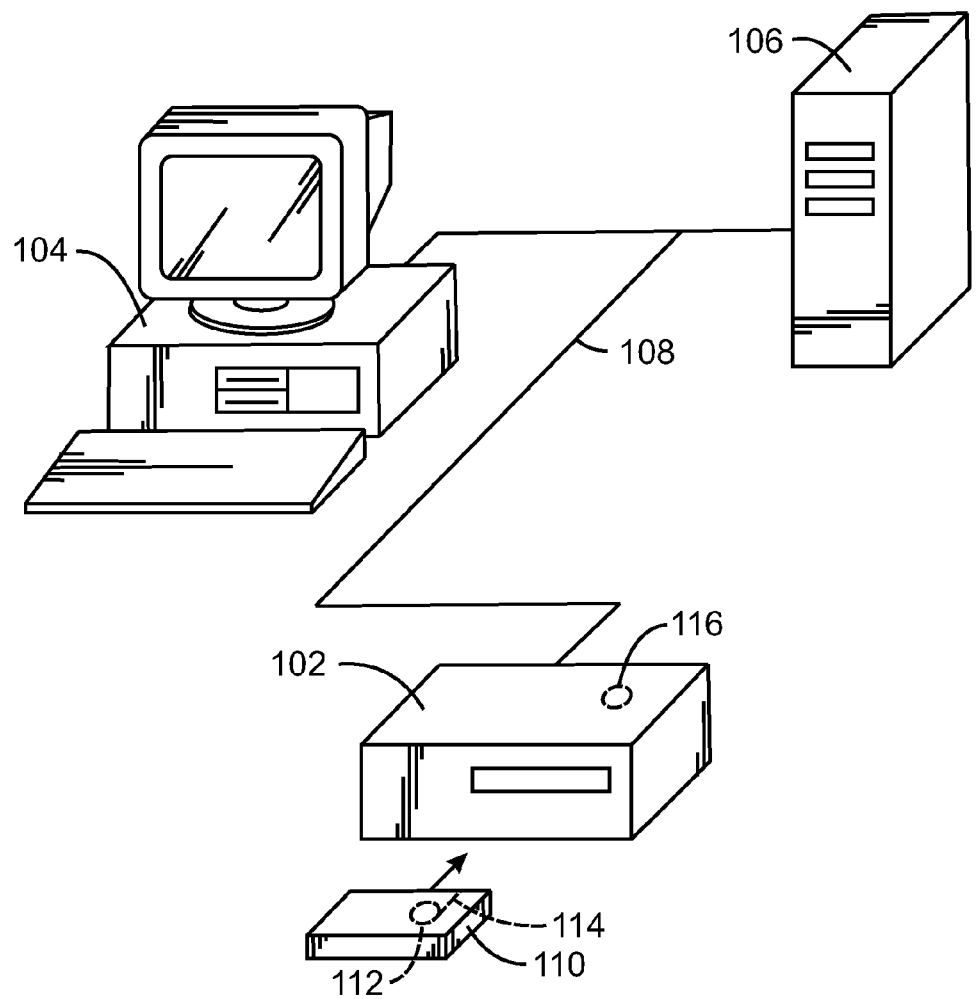
FIG. 1 is a schematic of a computer network environment that may be used to implement a method for reading unstable magnetic tape.

FIG. 1 is a schematic of a computer network environment 100 that may be used to implement a method for reading unstable magnetic tape. The computer network environment 100 may include a linear tape drive 102 that is communicably coupled to a computer 104 or a network server 106, or both, via a wired connection 108. However, in various examples, the linear tape drive 102 is communicably coupled to the computer 104 or the network server 106, or both, via a wireless connection, such as a wide area network (WAN), local area network (LAN), or the Internet.

The computer 104 or the network server 106 may be configured to read data from and write data to the linear tape drive 102. The computer 104 and the network server 106, together or individually, may form a host system for the linear tape drive 102. In various examples, the linear tape drive 102 is a data storage and retrieval device that is configured in the form of a stand-alone computer linear tape drive. In other examples, the linear tape drive 102 is disposed within the computer 104 or the network server 106. For example, the linear tape drive 102 may be supported in a bay inside a housing of the computer 104 or the network server 106.

As shown in FIG. 1, the linear tape drive 102 is configured to use tape cartridges such as a data tape cartridge 110. The data tape cartridge 110 may be a single-reel linear tape cartridge. The data tape cartridge 110 may include a magnetic tape carrier in the form of a reel 112 and magnetic tape 114 that is wound onto the reel 112. In addition, a second reel 116 may be included within the linear tape drive 102, which is configured to engage the magnetic tape 114. Thus, the second reel 116 works with the reel 112 to form a magnetic tape carrier. In other examples, the data tape cartridge 110, itself, includes two reels 112.

In some examples, the magnetic tape 114 is configured to have a width of approximately one-half inch. The magnetic tape 114 will also have a length extending in a direction perpendicular to the width, with a number of parallel tracks being defined across the width of the magnetic tape 114. Such tracks extend in the direction of the length of the magnetic tape 114, and are used to store data as well as servo information.

It is to be understood that the computer network environment 100 may include any number of additional components not shown in FIG. 1. In addition, any number of the components shown in FIG. 1 may not be included within the computer network environment 100, depending on the specific application.

Figure 2A:
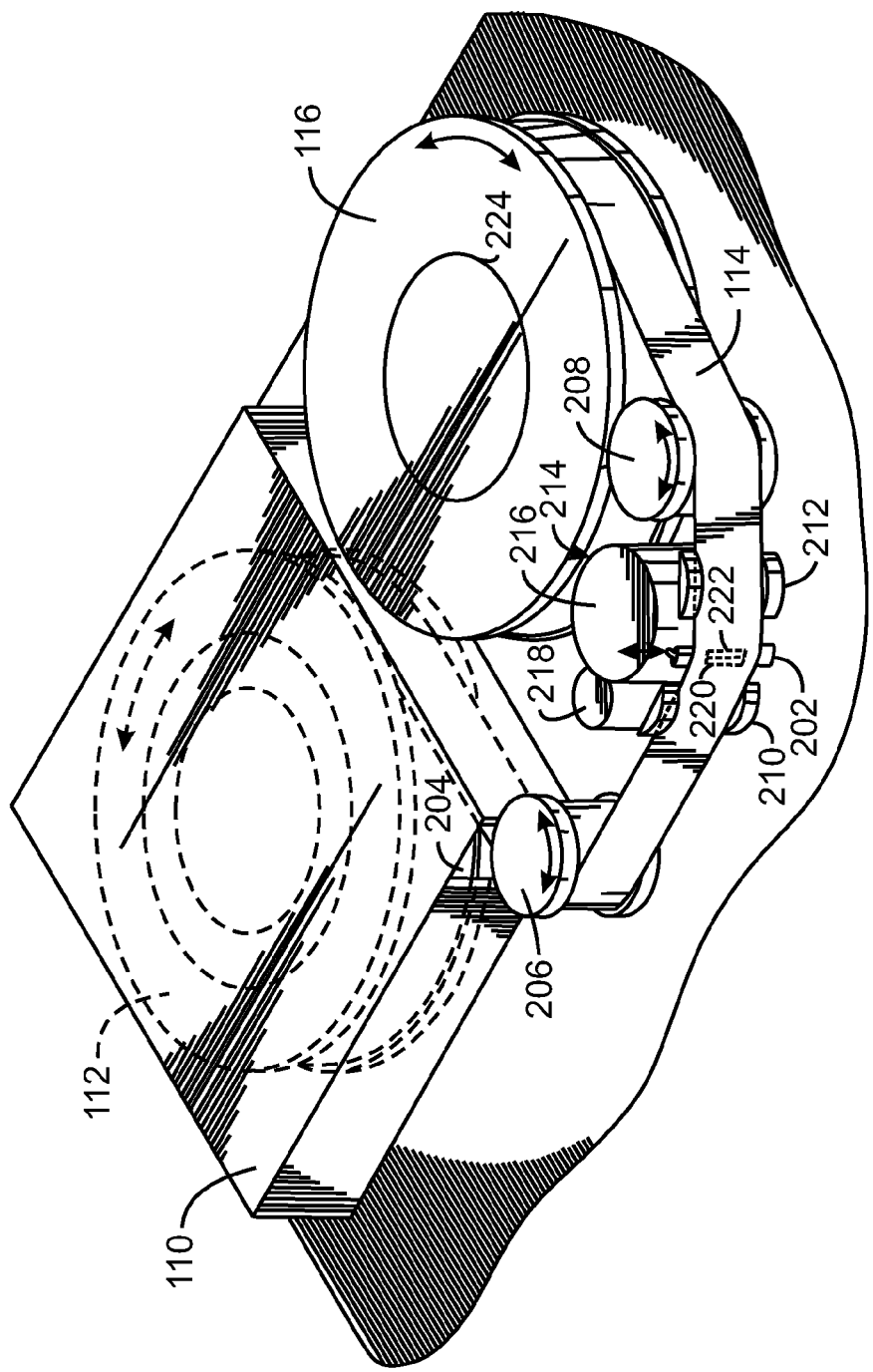
FIG. 2A is a schematic of the internal operating configuration of the linear tape drive after the insertion of the data tape cartridge.

FIG. 2A is a schematic of the internal operating configuration of the linear tape drive 102 after the insertion of the data tape cartridge 110. Like numbered items are as described with respect to FIG. 1. The loading of the data tape cartridge 110 may be performed such that the magnetic tape 114 is positioned for linear movement along a magnetic tape head 202, or transducer head.

As shown in FIG. 2A, the magnetic tape 114 exits the data tape cartridge 110 via an exit aperture 204. The magnetic tape 114 may then travel around roller guides 206 and 208, as well as stationary guides 210 and 212. The movement of the magnetic tape 114 may be such that tension is applied to the magnetic tape head 202 by the magnetic tape 114 during the normal operation of the linear tape drive 102.

The magnetic tape head 202 may be supported for up-and-down movement by a linear actuator 214. The linear actuator 214 is shown in FIG. 2A in a simplified form as a cylindrical body with an actuator housing 216. However, it is to be understood that the linear actuator 214 may be formed from any of a number of configurations presently understood in the art, wherein a linear-magnet displacement member enables movement of the magnetic tape head 202 transverse to the travel direction of the magnetic tape 114 in response to input from a controller 218.

The controller 218 may include firmware that is configured to direct the functioning of the hardware within the linear tape drive 102. For example, the controller 218 may direct the linear actuator 214 to effect the movement of the magnetic tape head 202. Such a movement of the magnetic tape head 202 may allow read and write sensing elements on the magnetic tape head 202 to be properly positioned onto tracks of data contained on the magnetic tape 114. Additionally, the controller 218 may select the interleaved data read elements from two sets of data read elements with different channel pitches.

The magnetic tape head 202 may be a transducer that is configured to convert electrical data signals received from the computer 104 or the network server 106, for example, to magnetic fluctuations that are contained within the magnetic tape 114, and vice versa. In various examples, the magnetic tape head 202 includes a number of data read elements (not shown) and data write elements (not shown) that are configured to read data from or write data to the magnetic tape 114, respectively. For example, the magnetic tape head 202 may include one or more write arrays 220 and one or more read arrays 222, as discussed further with respect to FIG. 2B.

In various examples, the second reel 116, i.e., the reel that is built into the linear tape drive 102, includes a leader block assembly 224 including a number of leader pins (not shown). The leader block assembly 224 may enable the loading and unloading of the magnetic tape 114 during the loading and unloading of the data tape cartridge 110 within the linear tape drive 102. The leader block assembly 224 may be any of a number of different types of leader block assemblies that are presently understood in the art.

It is to be understood that the linear tape drive 102 may include any number of additional components not shown in FIG. 2A. In addition, any number of the components shown in FIG. 2A may not be included within the linear tape drive 102, depending on the specific application.

Figure 2B:
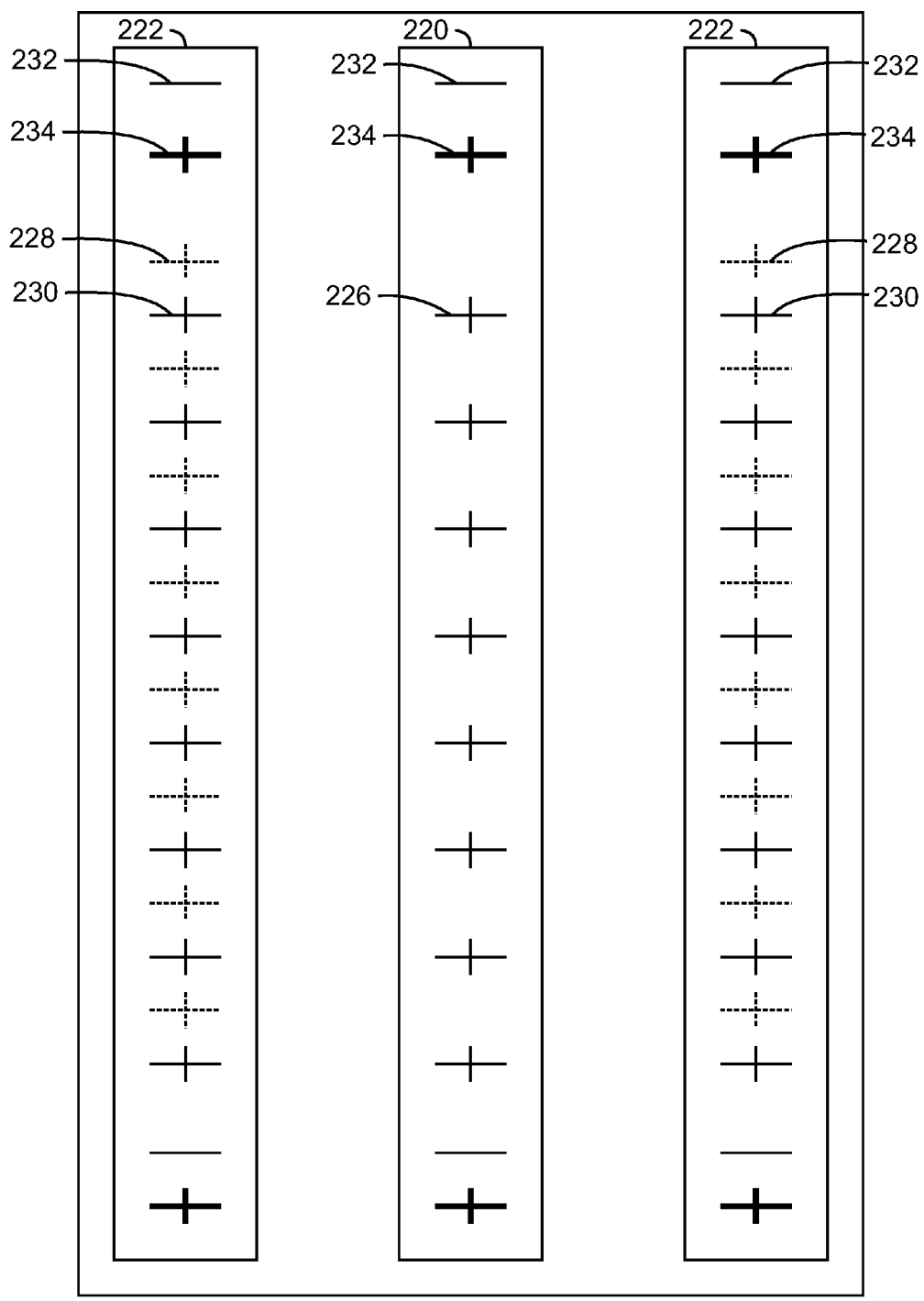
FIG. 2B is a perspective view of the magnetic tape head of the linear tape drive.

FIG. 2B is a perspective view of the magnetic tape head 202 of the linear tape drive 102. Like numbered items are as described with respect to FIGS. 1 and 2A. The magnetic tape head 202 may include one write array 220, which includes one set of data write elements 226, and the two read arrays 222, each of which includes two sets of data read elements 228 and 230. The write array 220 may be located between the two read arrays 222, as shown in FIG. 2B. In other words, the magnetic tape head 202 may include one read array 222 that is located upstream of the write array 220 and another read array 222 that is located downstream of the write array 220.

In addition, within each of the read arrays 222, one set of data read elements 228 may include a channel pitch that is slightly larger than a nominal channel pitch, while the other set of data read elements 230 may include a channel pitch that is slightly smaller than the nominal channel pitch. Thus, if the magnetic tape 114 has experienced some degree of expansion, the set of data read elements 228 with the larger channel pitch may be used to read the magnetic tape 114. On the other hand, if the magnetic tape 114 has experienced some degree of contraction, the set of data read elements 230 with the smaller channel pitch may be used to read the magnetic tape 114. The nominal channel pitch may be any number of values, depending on the specific application. For example, the nominal channel pitch may be 333 μm, 166.5 μm, or 87.25 μm.

In addition, the magnetic tape head 202 may include a number of servo elements 232 and 234 that are configured to read servo code from and write servo code to the magnetic tape 114. The servo elements 232 and 234 may also be configured for reading and writing servo information, as well as data, from a portion of the magnetic tape 114. In various examples, the servo elements 232 and 234 are used by the magnetic tape head 202 to determine whether the magnetic tape 114 has experienced expansion or contraction, as well as the extent of the expansion or contraction. The servo elements, in conjunction with the controller 218, may aid in the positioning of the magnetic tape head 202 such that the appropriate set of data read elements is aligned with the desired data tracks on the magnetic tape 114. In addition, the servo elements 232 and 234 may allow for the elimination of one source of tracking error, namely, the tangent of the angular misalignment of the magnetic tape head 202 multiplied by the distance between the write array 220 and each of the read arrays 222.

It is to be understood that the magnetic tape head 202 may include any number of additional components not shown in FIG. 2B. In addition, any number of the components shown in FIG. 2B may not be included within the magnetic tape head 202, depending on the specific application.

Figure 3:
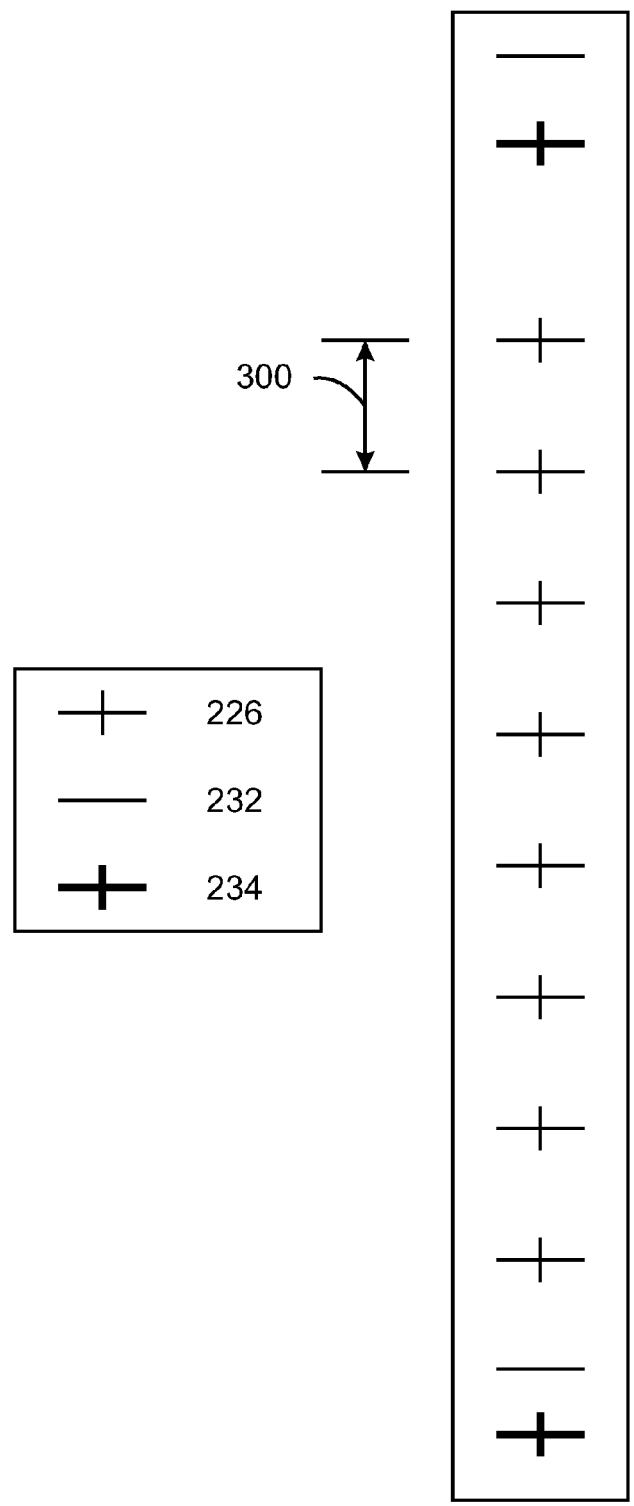
FIG. 3 is a schematic of the write array that may be included on the magnetic tape head of the linear tape drive.

FIG. 3 is a schematic of the write array 220 that may be included on the magnetic tape head 202 of the linear tape drive 102. Like numbered items are as described with respect to FIGS. 1, 2A, and 2B. The write array 220 may include the set of data write elements 226. Adjacent data write elements 226 within the write array 220 may include a specific channel pitch 300. The write array 220 may also include the servo elements 232 and 234, which may be used to read from and write to the servo code, as discussed above with respect to FIG. 2B.

In various examples, the write array 220 is an array of hardware write elements that is configured to convert an electrical signal that is received from a host system, such as the computer 104 or the network server 106, to a magnetic flux. The write array 220 may also be configured to write the resulting magnetic flux to the magnetic tape 114 that is loaded within the linear tape drive 102 by encoding magnetic fluctuations onto the magnetic tape 114. Further, it is to be understood that, while FIG. 3 shows only eight data write elements 226, the write array 220 may include any number of additional data write elements 226. For example, in various examples, the write array 220 could include sixteen or thirty-two data write elements 226.

Figure 4:
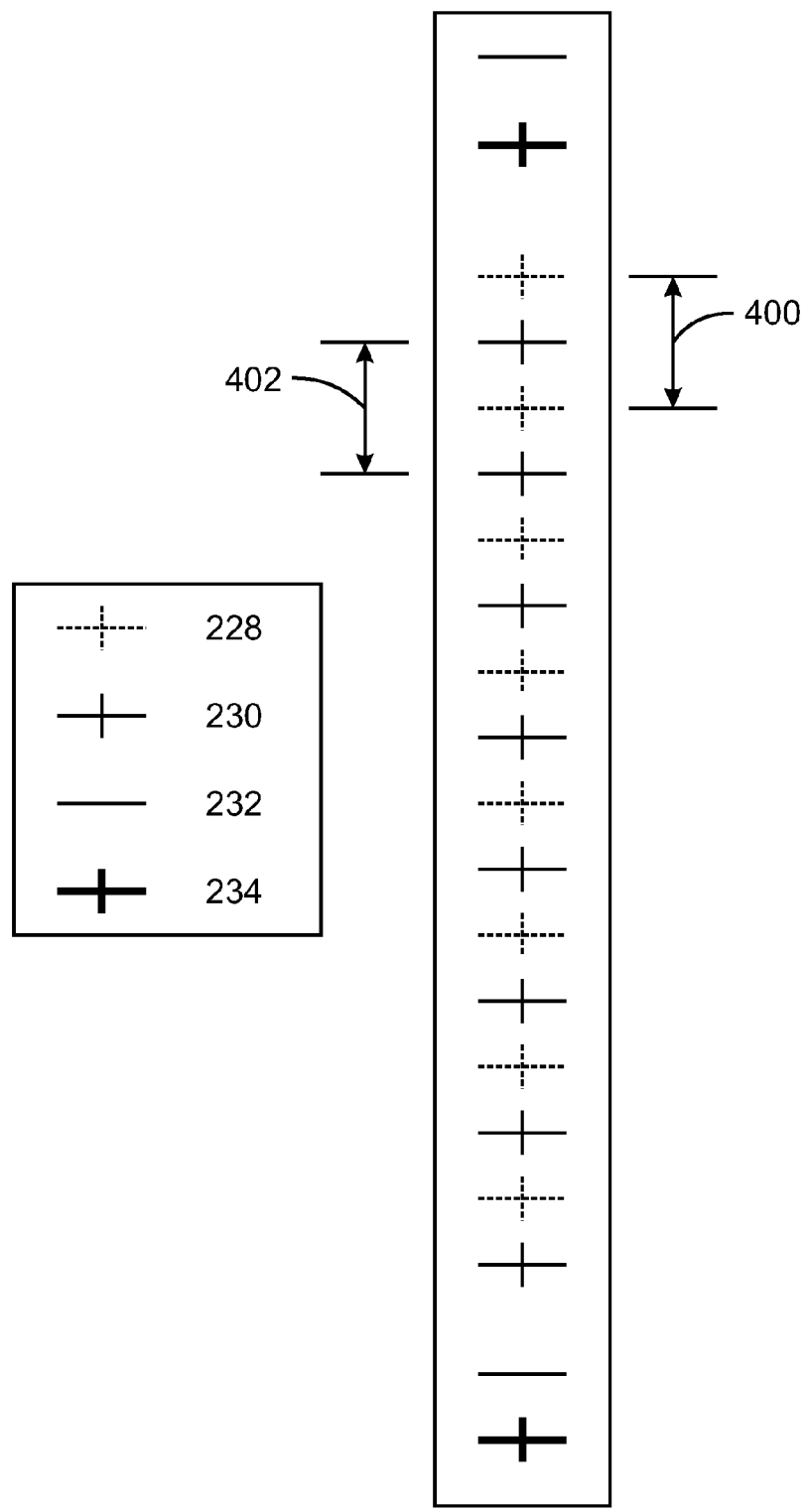
FIG. 4 is a schematic of one of the read arrays that may be included on the magnetic tape head of the linear tape drive.

FIG. 4 is a schematic of one of the read arrays 222 that may be included on the magnetic tape head 202 of the linear tape drive 102. Like numbered items are as described with respect to FIGS. 1, 2A, 2B, and 3. The read array 222 may include the first set of data read elements 228 and the second set of data read elements 230. In examples, the first set of data read elements 228 is interleaved with the second set of data read elements 230 within the read array 222. In other words, the data read elements within the two sets of data read elements 228 and 230 may alternate with one another.

The read array 222 may also include a first set of servo elements 232 corresponding to the first set of data read elements 228 and a second set of servo elements 234 corresponding to the second set of data read elements 230. The servo elements 232 and 234 may be used to read from and write to the servo code, as discussed above with respect to FIG. 2B.

According to examples disclosed herein, the first set of data read elements 228 may include a channel pitch 400 that is slightly larger than the nominal channel pitch. For example, the channel pitch of the first set of data read elements 228 may be approximately 500 parts per million (ppm) larger than the nominal channel pitch. The larger channel pitch may provide an adequate track edge margin during a read verification mode, during which the dimensional stability of the magnetic tape 114 is not a concern due to the short time between read and write operations. In addition, if the magnetic tape 114 has expanded laterally from the time of writing, the first set of data read elements 228 may provide the capability to read the data back despite the increase in track pitch of the magnetic tape 114.

The second set of data read elements 230 may include a channel pitch 402 that is slightly smaller than the nominal channel pitch. For example, the channel pitch of the second set of data read elements 230 may be approximately 500 ppm smaller than the nominal channel pitch. Thus, if the magnetic tape 114 has contracted laterally from the time of writing, the second set of data read elements 230 may provide the capability to read the data back despite the decrease in track pitch of the magnetic tape 114.

It is to be understood, while FIG. 4 shows only eight data read elements within each of the sets of data read elements 228 and 230, the read array 222 may include any number of additional data read elements within each of the sets of data read elements 228 and 230. For example, in various examples, the read array 222 includes thirty-two data read elements within both the first set of data read elements 228 and the second set of data read elements 230.

Further, in various examples, the first set of servo elements 232 and the second set of servo elements 234 are configured to determine whether the magnetic tape 114 has expanded or contracted based on the track pitch of the magnetic tape 114. Then, the first set of servo elements 232 and the second set of servo elements 234 may determine whether to use the first set of data read elements 228 or the second set of data read elements 230 to read the desired data from the magnetic tape 114. Once the appropriate set of data read elements 228 or 230 to be used has been determined, the corresponding set of servo elements 232 or 234 may be configured to adjust the position of the magnetic tape head 202 in preparation for the reading of the data from the magnetic tape 114. Thus, the magnetic tape head 202 within the linear tape drive 102 may automatically accommodate for the degradation, e.g., the expansion and contraction, of the magnetic tape 114 over time. Further, if the magnetic tape 114 has neither expanded nor contracted, either the first set of data read elements 228 or the second set of data read elements 230 may be used to read the data from the magnetic tape 114.

In some examples, the write array 220 could be merged with one of the read arrays 222, meaning that one array could include a row of data read elements and a row of data write elements, with one row arranged over the other. In this case, the merged array would use its own servo elements on the read layer when writing to the magnetic tape 114.

Figure 5:
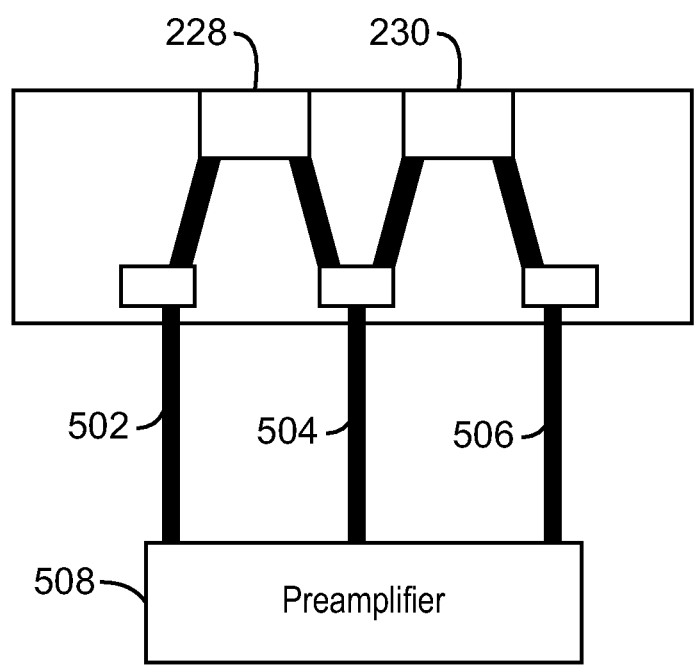
FIG. 5 is a schematic of an exemplary electrical configuration of the magnetic tape head.

FIG. 5 is a schematic of an exemplary electrical configuration 500 of the magnetic tape head 202. Like numbered items are as described with respect to FIGS. 1, 2A, 2B, and 4. The electrical configuration includes a number of flexible traces, or conductors, 502, 504, and 506 that are configured to connect the magnetic tape head 202 to a preamplifier 508 of the linear tape drive 102. More specifically, each of the flexible traces 502, 504, and 506 may connect one or more of the data read elements from the first set of data read elements 228 and the second set of data read elements 230 to the preamplifier 508.

In various examples, adjacent data read elements within the two sets of data read elements 228 and 230 share a common lead. For example, as shown in FIG. 5, the flexible trace 504 is shared by the adjacent data read elements from the two sets of data read elements 228 and 230. This reduces the number of flexible traces 502, 504, and 506 that are included within the linear tape drive 102.

Further, according to the example shown in FIG. 5, the preamplifier allows for a bidirectional current flow along the common lead, i.e., the shared flexible trace 504. Thus, while the unshared flexible traces 502 and 506 have a plus bias, the shared flexible trace 504 has a bidirectional bias. According to the electrical configuration 500, the first unshared flexible trace 502 and the shared flexible trace 504 may be activated for reading magnetic tape with a nominal track pitch, while the shared flexible trace 504 and the second unshared flexible trace 506 may be activated for reading magnetic tape with a track pitch that is less than the nominal track pitch. Thus, any of the flexible traces 502, 504, or 506 may be activated or deactivated, depending on the specific application.

Figure 6:
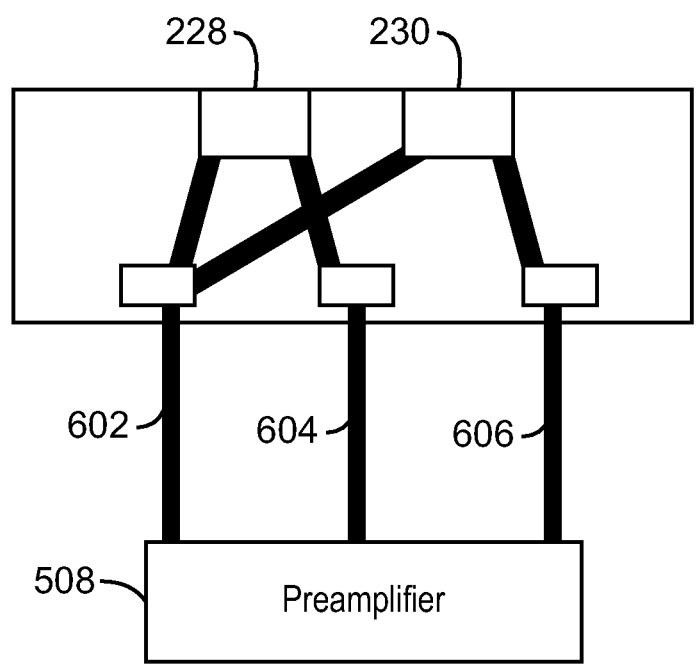
FIG. 6 is a schematic of another exemplary electrical configuration of the magnetic tape head.

FIG. 6 is a schematic of another exemplary electrical configuration 600 of the magnetic tape head 202. Like numbered items are as described with respect to FIGS. 1, 2A, 2B, 4, and 5. The electrical configuration 600 may be the same as the electrical configuration 500 discussed above, except the flexible traces 602, 604, and 604 of the electrical configuration 600 may include different biases. More specifically, the first unshared flexible trace 602 may have a plus bias, while the shared flexible trace 604 and the second unshared flexible trace 606 may have minus biases. Thus, the common lead, i.e., the shared flexible trace 604, may be routed such that it is the negative polarity for both of the adjacent data read elements from the first set of data read elements 228 and the second set of data read elements 230. In addition, according to the electrical configuration 600, the first unshared flexible trace 602 and the shared flexible trace 604 may be activated for reading magnetic tape with a nominal track pitch, while the shared flexible trace 604 and the second unshared flexible trace 606 may be activated for reading magnetic tape with a track pitch that is less than the nominal track pitch. Thus, any of the flexible traces 602, 604, or 606 may be activated or deactivated, depending on the specific application.

Figure 7:
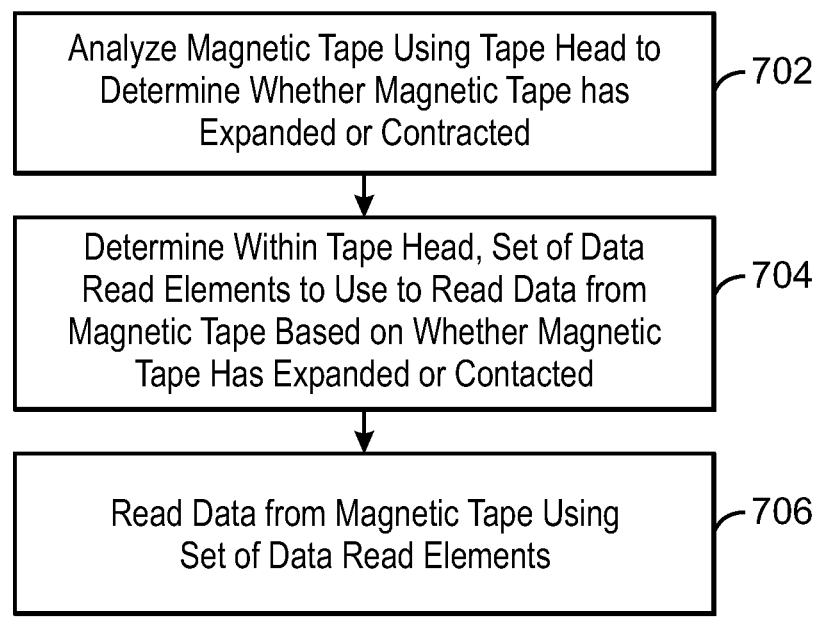
FIG. 7 is a process flow diagram showing a method for reading unstable magnetic tape using a magnetic tape head.

FIG. 7 is a process flow diagram showing a method 700 for reading unstable magnetic tape using a magnetic tape head. In various examples, the magnetic tape head is the magnetic tape head 202 that is disposed within the linear tape drive 102, as discussed above with respect to FIGS. 1, 2A, and 2B. In addition, the magnetic tape may be the magnetic tape 114 that is included within the data tape cartridge 110, as discussed above with respect to FIG. 1.

The method 700 begins at block 702, at which magnetic tape is analyzed using a tape head to determine whether the magnetic tape has expanded or contracted. In various examples, determining that the magnetic tape has expanded includes detecting a track pitch that has increased since the magnetic tape was written, while determining that the magnetic tape has contracted includes detecting a track pitch that has decreased since the magnetic tape was written.

At block 704, a set of data read elements to be used to read data from the magnetic tape is determined based on whether the magnetic tape has expanded or contracted. The set of data read elements may be chosen from two sets of interleaved data read elements with different channel pitches that are included within a read array. The first set of data read elements may include a channel pitch that is larger than a nominal channel pitch, while the second set of data read elements may include a channel pitch that is smaller than a nominal channel pitch. The nominal channel pitch may be the original channel pitch of the magnetic tape at the time of writing. Further, in various examples, determining the set of data read elements to use to read the magnetic tape includes analyzing the track pitch of the magnetic tape using a pair of servo elements corresponding to each of the two sets of interleaved data read elements.

At block 706, data is read from the magnetic tape using the set of data read elements. The first set of data read elements may be used to read the data from the magnetic tape if the magnetic tape has expanded, while the second set of data read elements may be used to read the data from the magnetic tape if the magnetic tape has contracted. In addition, reading the data from the magnetic tape may include aligning the set of data read elements with the magnetic tape based on a location of the data on the magnetic tape. Such an alignment process may be achieved using a controller that effects the alignment of the set of data read elements with the magnetic tape based on feedback from the pair of servo elements corresponding to the desired set of data read elements. Further, once the data has been read from the magnetic tape, the magnetic tape head may send the data to a host system that requested the data, such as, for example, the computer 104 or the network server 106 discussed above with respect to FIG. 1.

The process flow diagram of FIG. 7 is not intended to indicate that the steps of the method 700 are to be executed in any particular order, or that all of the steps of the method 700 are to be included in every case. Further, any number of additional steps may be included within the method 700, depending on the specific application. For example, if the magnetic tape has neither expanded nor contracted since it was written, either of the two sets of data read elements can be used to read data from the magnetic tape. In addition, the method 700 may include writing data to the magnetic tape using a set of data write elements that are included within the write array.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A tape head, comprising:
    two read arrays, wherein each of the two read arrays comprises a first set of data read elements of a first channel pitch and a second set of data read elements of a second channel pitch, wherein the first channel pitch and the second channel pitch are different and wherein the first set of data read elements and the second set of data read elements are interleaved; and
    a write array located between the two read arrays.

2. The tape head of claim 1, wherein the tape head is disposed within a linear tape drive.

3. The tape head of claim 2, wherein the tape head is configured to read magnetic tape that has been inserted into the linear tape drive.

4. The tape head of claim 3, wherein the magnetic tape comprises expanded magnetic tape comprising a track pitch that is larger than an original track pitch.

5. The tape head of claim 4, wherein the first set of data read elements comprises a channel pitch that is larger than a nominal channel pitch, and wherein the first set of data read elements is configured to read data from the expanded magnetic tape.

6. The tape head of claim 3, wherein the magnetic tape comprises contracted magnetic tape comprising a track pitch that is smaller than an original track pitch.

7. The tape head of claim 6, wherein the second set of data read elements comprises a channel pitch that is smaller than a nominal channel pitch, and wherein the second set of data read elements is configured to read data from the contracted magnetic tape.

8. A method for reading magnetic tape that has expanded or contracted, comprising:
    analyzing magnetic tape using a tape head to determine whether the magnetic tape has expanded or contracted;
    determining, within the tape head, a set of data read elements to use to read data from the magnetic tape based on whether the magnetic tape has expanded or contracted, wherein the set of data read elements is chosen from two sets of interleaved data read elements with different channel pitches; and
    reading the data from the magnetic tape using the set of data read elements.

9. The method of claim 8, comprising writing data to the magnetic tape using the set of data write elements.

10. The method of claim 8, wherein determining that the magnetic tape has expanded comprises detecting a track pitch that has increased since the magnetic tape was written.

11. The method of claim 8, wherein determining that the magnetic tape has contracted comprises detecting a track pitch that has decreased since the magnetic tape was written.

12. The method of claim 8, wherein determining the set of data read elements to use to read the magnetic tape comprises analyzing a track pitch of the magnetic tape using a pair of servo elements corresponding to each of the two sets of interleaved data read elements.

13. The method of claim 8, wherein reading the data from the magnetic tape comprise aligning the set of data read elements with the magnetic tape based on a location of the data on the magnetic tape.

14. The method of claim 8, comprising sending the data from the tape head to a host system that requested the data.

15. A linear tape drive, comprising a magnetic tape head, wherein the magnetic tape head comprises a read array comprising servo elements and two sets of interleaved data read elements, wherein each of the two sets of interleaved data read elements comprises a different channel pitch, and wherein the magnetic tape head is configured to:

determine, using the servo elements, a set of data read elements to be used for reading data from magnetic tape that has been loaded into the linear tape drive;

read the data from the magnetic tape using the set of data read elements.

16. The system of claim 15, wherein the magnetic tape head comprises a write array comprising additional servo elements and data write elements.

17. The system of claim 15, wherein a first one of the two sets of interleaved data read elements comprises a channel pitch that is larger than nominal, and a second one of the two sets of interleaved data read elements comprises a channel pitch that is smaller than nominal.

18. The system of claim 15, wherein the servo elements are configured to align the set of data read elements within the magnetic tape head with the data to be read from the magnetic tape via a controller.

19. A linear tape drive, comprising:

a magnetic tape head, wherein the magnetic tape head comprises a read array comprising servo elements and two sets of interleaved data read elements, wherein each of the two sets of interleaved data read elements comprises a different channel pitch, and wherein the magnetic tape head is configured to:

determine, using the servo elements, a set of data read elements to be used for reading data from magnetic tape that has been loaded into the linear tape drive; and read the data from the magnetic tape using the set of data read elements; and a plurality of flexible traces configured to connect each data read element within the two sets of interleaved data read elements to a preamplifier within the linear tape drive.

20. The system of claim 19, wherein adjacent data read elements within the two sets of interleaved data read elements are connected to the preamplifier using a shared flexible trace.

* * * * *